W. M. SHEEHAN.
LOCOMOTIVE FRAME.
APPLICATION FILED JULY 31, 1916.
1,247,731.
Patented Nov. 27, 1917.
6 SHEETS—SHEET 6.
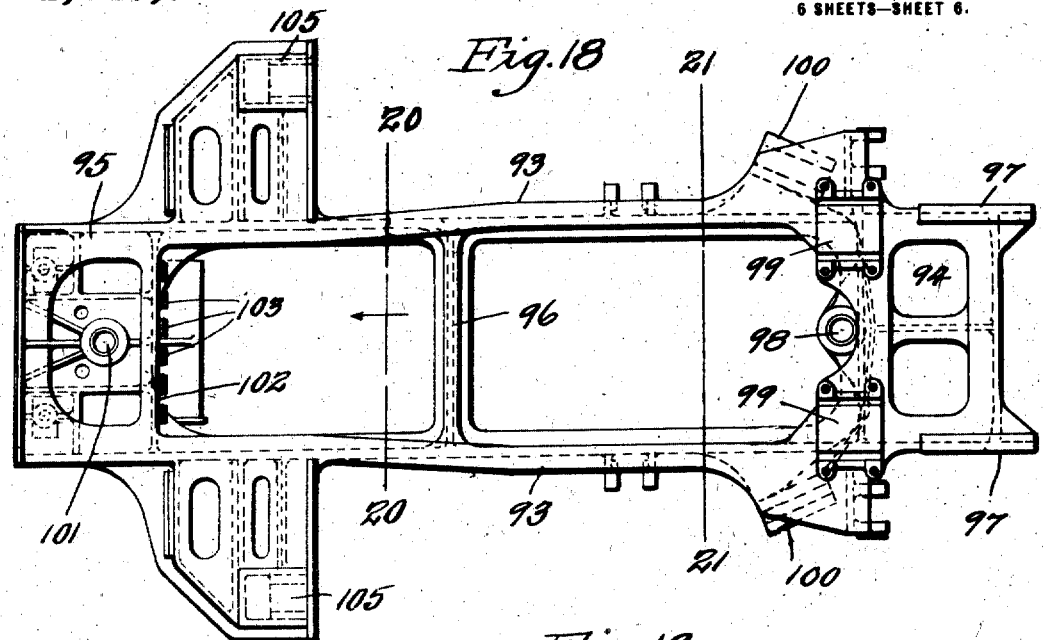
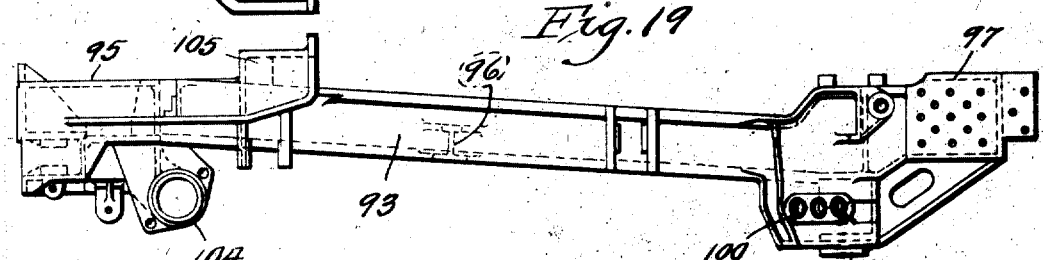
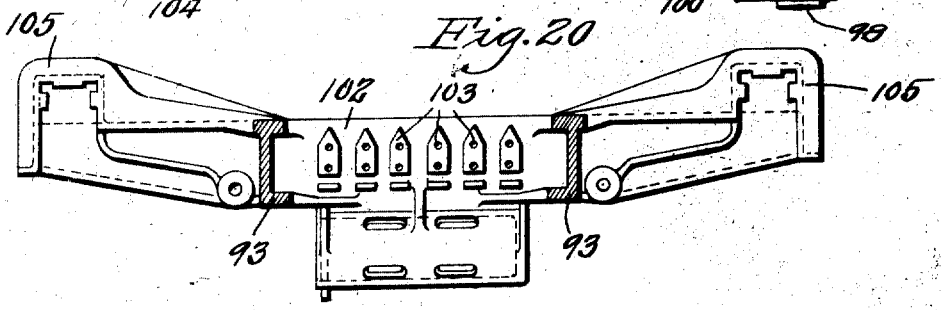
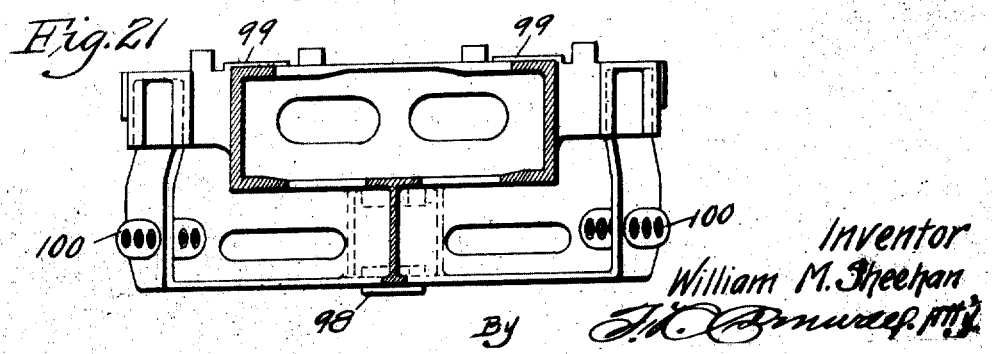
Inventor
William M. Sheehan
By

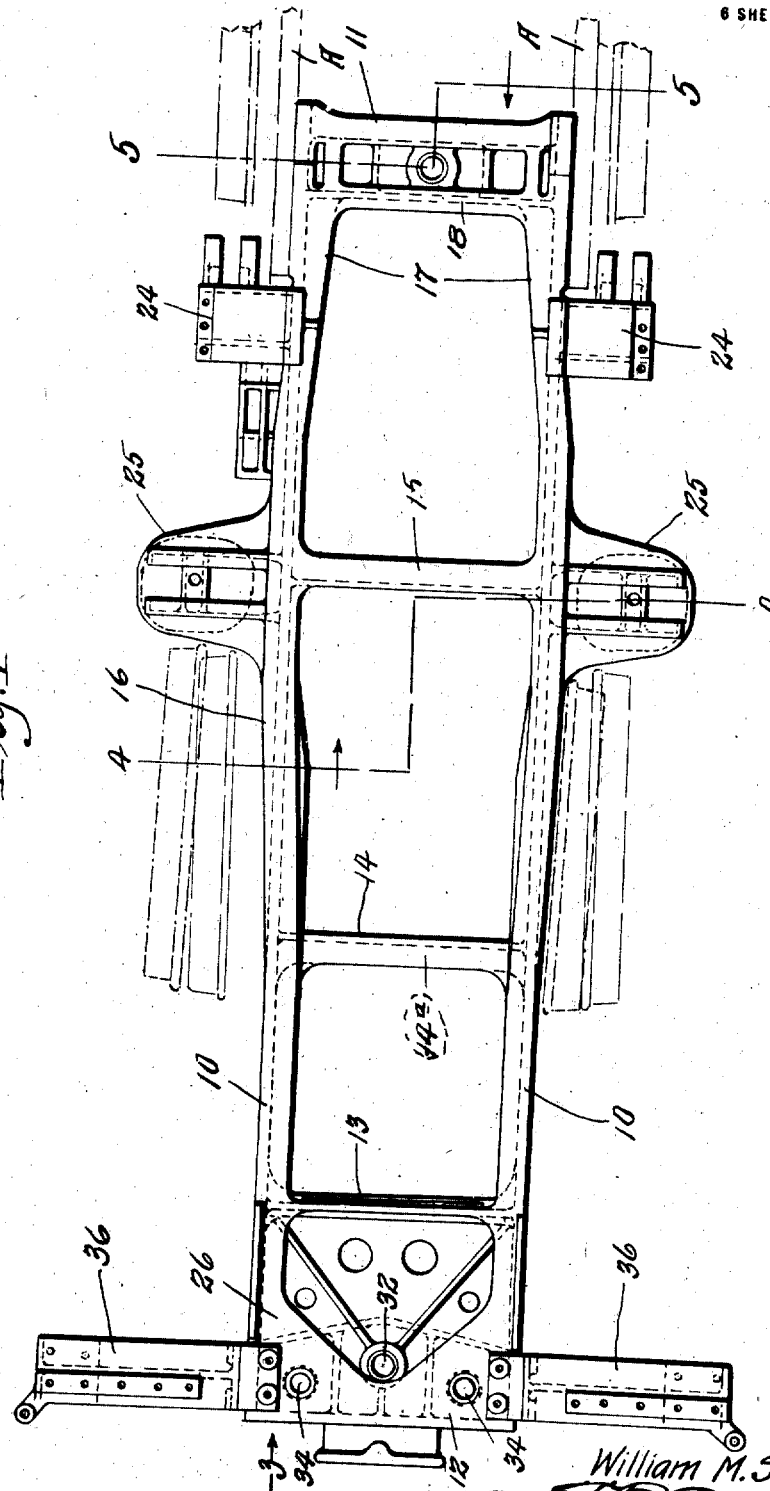

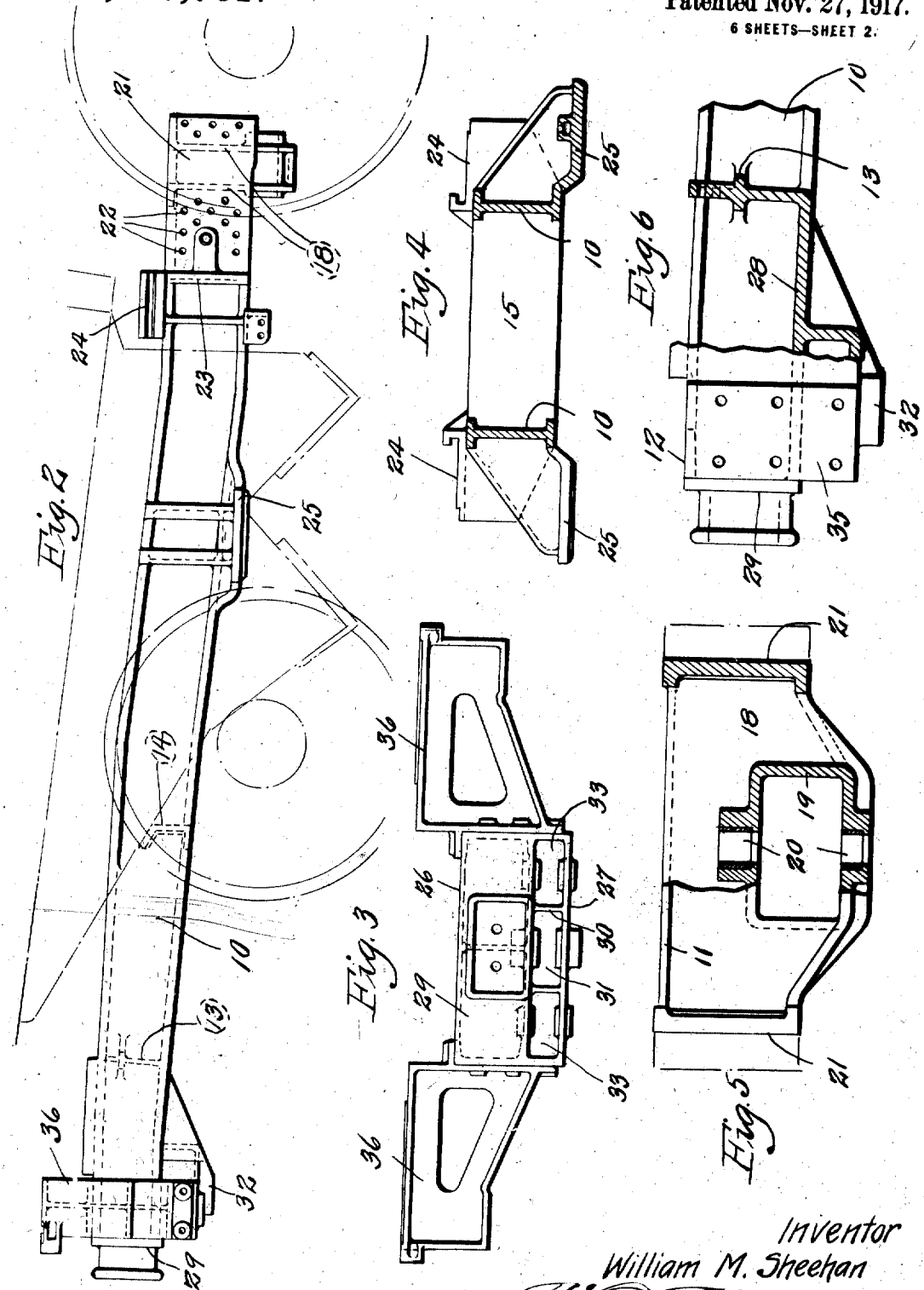

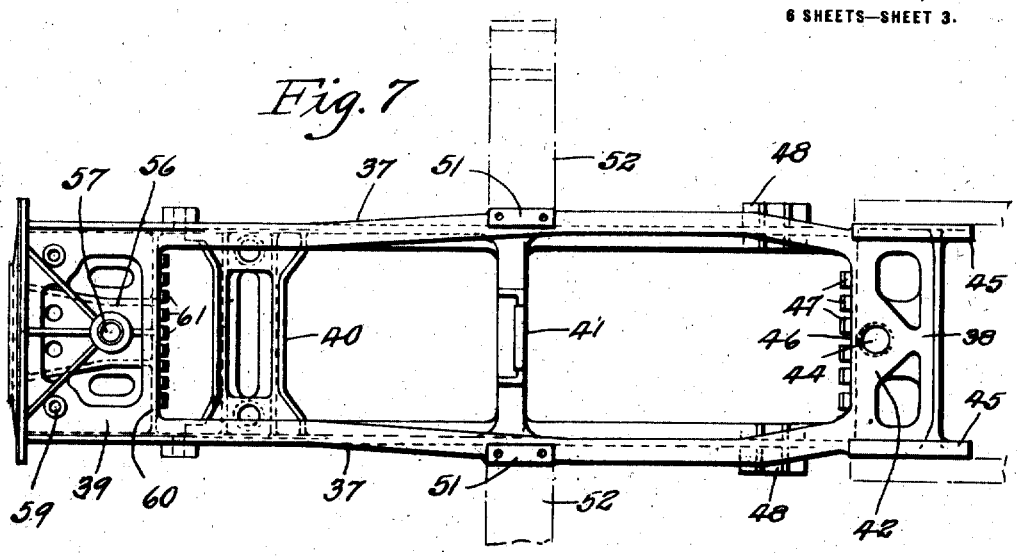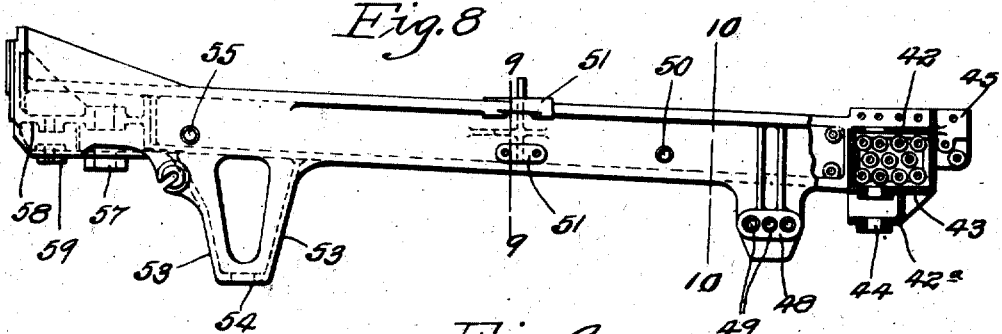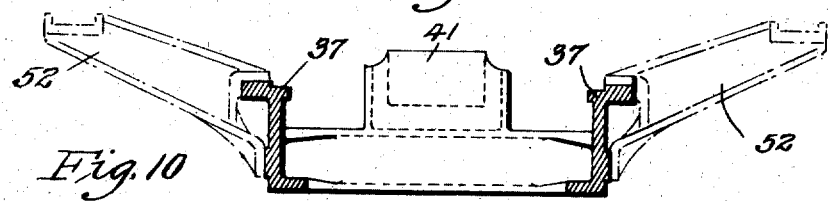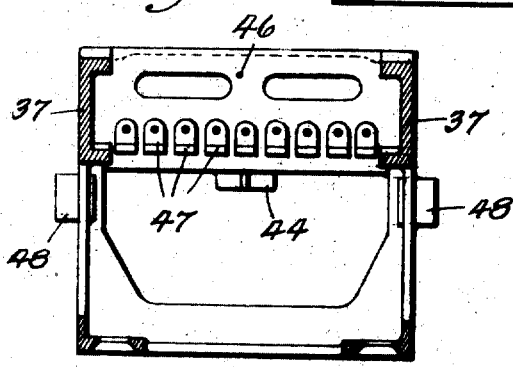

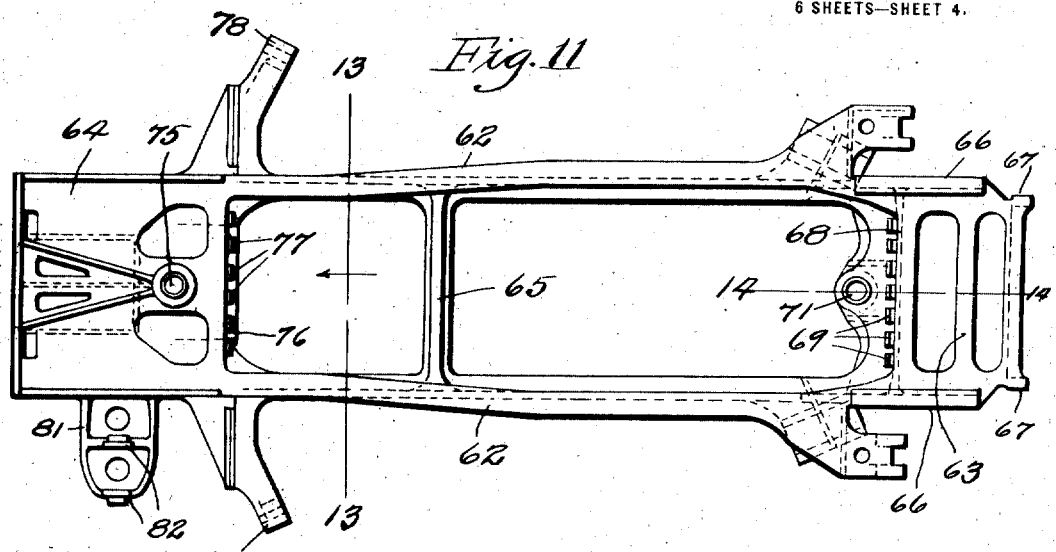
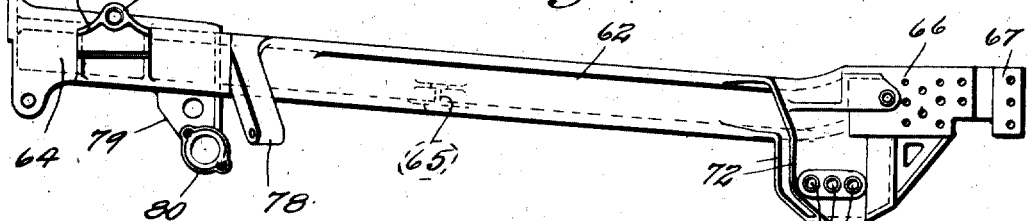
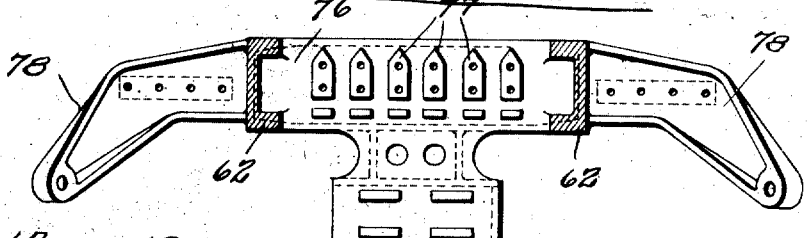
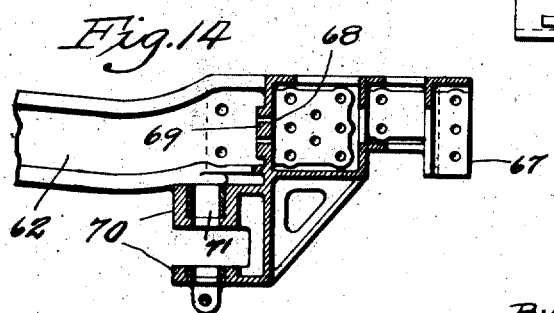

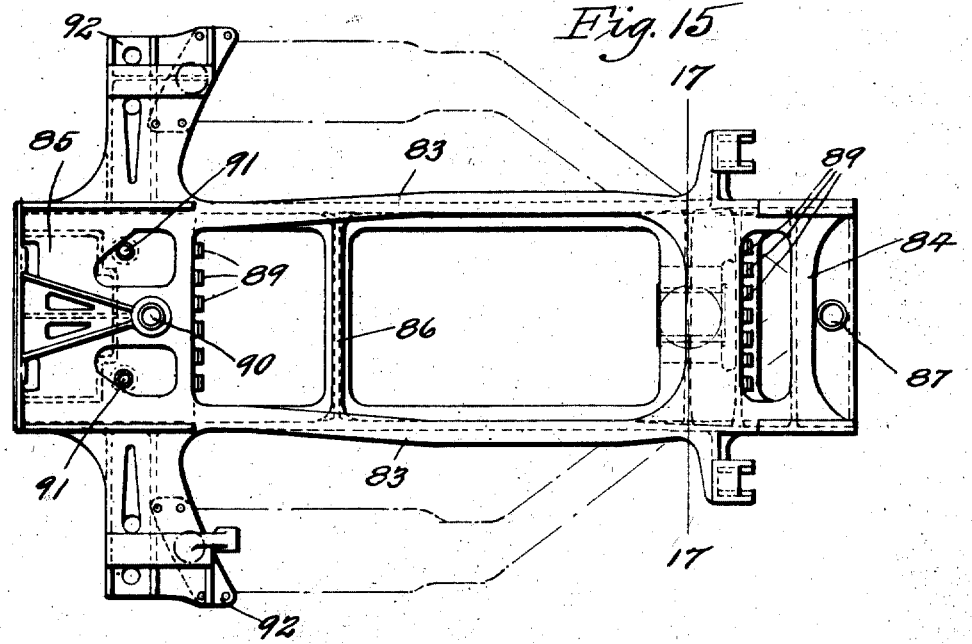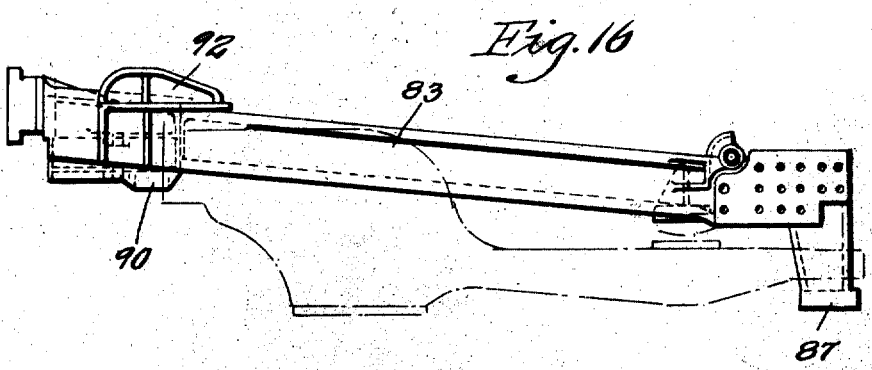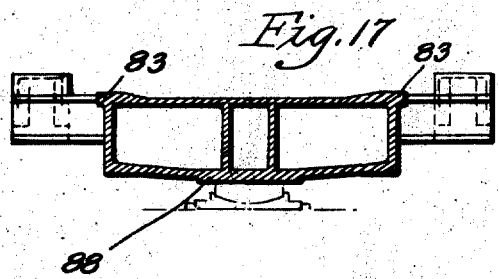

UNITED STATES PATENT OFFICE.

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE-FRAME.

1,247,731.      Specification of Letters Patent.      Patented Nov. 27, 1917.

Application filed July 31, 1916. Serial No. 112,304.

*To all whom it may concern:*

Be it known that I, WILLIAM M. SHEEHAN, a citizen of the United States, residing at St. Louis, Missouri, have invented a certain new and useful Improvement in Locomotive-Frames, of which the following is a full, clear, and exact description, such as will enable others skilled in the art to which it appertains to make and use the same, reference being had to the accompanying drawings, forming part of this specification.

My invention relates generally to locomotive frames or cradles and more particularly to the types of frames disclosed in Patents Nos. 1,114,192 and 1,114,193, issued to my assignee October 20, 1914, the principal objects of my present invention being to generally improve upon and simplify the construction of the types of frames or cradles disclosed in said patents; to provide a comparatively simple, strong and rigid frame or cradle which, with slight structural changes, is applicable for use in connection with different types of engines, and likewise, and with all forms of trailer trucks now in general use; to construct the main body of the frame or cradle in a single piece, preferably by casting, thereby materially reducing the cost of manufacture and providing a frame which has the necessary strength and stability to withstand all strains, stresses and vibrations to which it may be subjected while in service; to form integral with the main frame various brackets and bearings which are necessary to accommodate essential parts of the locomotive and truck structures; to construct certain parts of the main frame or cradle so as to meet existing conditions, and provide the necessary clearance for adjacent and connecting parts of the locomotive body and trailer truck.

With the foregoing and other objects in view, my invention consists in certain novel features of construction and arrangement of parts, hereinafter more fully described, claimed and illustrated in the accompanying drawings, in which—

Figure 1 is a plan view of the frame or cradle of my improved construction.

Fig. 2 is a side elevational view of the type of frame illustrated in Fig. 1.

Fig. 3 is an elevational view of the frame looking in the direction indicated by the arrow 3, Fig. 1.

Fig. 4 is a cross sectional view taken approximately on the line 4—4 of Fig. 1.

Fig. 5 is an elevational view partly in section, said view being taken approximately on the line 5—5 of Fig. 1.

Fig. 6 is an enlarged elevational view of the rear end of the frame, with parts thereof in section.

Fig. 7 is a plan view of a modified form of the frame.

Fig. 8 is an elevational view of the modified form of the frame seen in Fig. 7, with one end thereof in vertical section.

Fig. 9 is a transverse section taken approximately on the line 9—9 of Fig. 8.

Fig. 10 is a transverse section taken approximately on the line 10—10 of Fig. 8.

Fig. 11 is a plan view of a further modified form of the frame or cradle.

Fig. 12 is a side elevational view of the type of cradle illustrated in Fig. 11.

Fig. 13 is an enlarged transverse section taken approximately on the line 13—13 of Fig. 11.

Fig. 14 is an enlarged vertical section taken approximately on the line 14—14 of Fig. 11.

Fig. 15 is a plan view of a further modified form of the frame or cradle.

Fig. 16 is an elevational view of the type of cradle illustrated in Fig. 15.

Fig. 17 is a cross section taken approximately on the line 17—17 of Fig. 15.

Fig. 18 is a plan view of a further modified form of my improved frame or cradle.

Fig. 19 is a side elevational view of the type of frame or cradle illustrated in Fig. 18.

Fig. 20 is a transverse section taken approximately on the line 20—20 of Fig. 18.

Fig. 21 is an enlarged transverse section taken approximately on the line 21—21 of Fig. 18.

The form of frame or cradle illustrated in Figs. 1 to 6, inclusive, is particularly designed to accommodate the "KW" type of trailer truck, which is disclosed in U. S. Patent No. 929,768, dated August 3, 1909. This frame or cradle is formed in a single piece, preferably by casting, and comprises a pair of substantially parallel side members 10, a substantially hollow front end member 11, a substantially hollow rear end member 12, and a series of intermediate transversely disposed members 13, 14 and 15.

The rear portions of members 10, or those portions adjacent to the transverse members 13 and 14 are preferably channel-shape in cross section with the flanges inwardly presented, and from member 14 to member 15, the inwardly presented flanges gradually diminish in width and outwardly presented flanges 16 are formed integral with the tops and bottoms of the webs of the side members.

By virtue of such construction, said side members are substantially of I-beam shape in cross section at points midway between the members 14 and 15, and at points slightly to the rear of member 15 said side members are of channel shape in cross section with their flanges outwardly presented. Said side members maintain this last mentioned cross sectional shape for a substantial distance in front of member 15, and as said side members approach the hollow front end member 11, the outwardly presented flanges gradually diminish in width, and inwardly presented flanges 17 of gradually increasing width are formed at the top and bottom of the web of each side member, so that immediately to the rear of the front end member 11, the side members are channel-shape in cross section with both flanges inwardly presented. By virtue of this construction, the space between the side members immediately in front and to the rear of the transverse member is substantially wider than the space between the end portions of said side members, such widened space being essential for the accommodation of certain parts of the locomotive and trailer truck. Further, this construction, in addition to providing ample clearance for adjacent and connecting parts, in no wise sacrifices the required strength of the frame and the webs of the side members 10 maintain vertical and parallel positions throughout the length of said frame.

The substantially hollow front end member comprises a pair of transversely disposed parallel walls 18, which are preferably flanged at top and bottom, and formed integral with said walls and between the central portions thereof is a substantially box-shape structure 19, the top and bottom walls of which are provided with apertures 20, preferably bushed, and serving as a bearing for the pin or bolt to which the radius bar (not shown) is pivoted.

The outer faces 21 of the forward ends of side members 10 are finished in any suitable manner in order to receive the rear ends of the side members A of the main frame of the locomotive, said side members being secured to the rear frame or cradle by means of bolts or the like which are seated in apertures 22, the same being formed through the forward portions of the vertical webs of members 10.

Formed integral with or fixed to the members 10 to the rear of the finished surfaces 21 are outwardly projecting brackets 23, and formed integral with the upper portions thereof are horizontally disposed plates 24, the same serving as bearings for expansion pads which are carried by the locomotive fire box.

Transverse member 15 is preferably of channel shape in cross section with its top and bottom flanges forwardly presented, said member serving to tie the side members 10 together and strengthen that portion of the frame or cradle which is provided with the supports for the equalizer fulcrums. These supports are in the form of plates 25, the same being formed integral with and projecting outwardly from members 10 near the ends of said transverse member 15 and the undersides of said plates are preferably finished.

Transverse member 14 is preferably channel shape in cross section with its top and bottom flanges rearwardly presented and the top flange 14$^a$ is preferably inclined so as to provide a seat and point of attachment for one of the bottom plates of a portion of the ash pan. (See Fig. 2.)

The hollow structure 12 connecting the rear ends of members 10 comprises a top plate 26, bottom plate 27, intermediate plate 28, and end plate 29, the latter extending only from top plate 26 to intermediate plate 28.

Formed integral with bottom plate 27 and intermediate plate 28 are vertically disposed walls 30, the same being located so as to divide the space between the vertical webs of members 10 into three pockets, the central one 31 of which is occupied by the end of the rear draw-bar, the latter being pivotally connected to the frame or cradle by a suitable pin which passes through openings 32, which latter are formed in bottom plate 27 and intermediate plate 28.

The pockets 33 to the sides of central pocket 31 are adapted to receive the ends of safety bars (not shown), the same being secured to the frame or cradle by suitable pins which pass through openings 34, and which latter are formed in the bottom plate 27 and intermediate plate 28. The ends of plates 26, 27 and 28 are connected by integrally formed vertically disposed plates 35, which latter occupy the same vertical planes with the webs of members 10 and the outer faces of these plates are finished in order to serve as seats and points of attachment for the cab supporting brackets 36.

In the modified construction illustrated in Figs. 7 to 10 inclusive, the frame or cradle is formed in a single piece, preferably by casting, and includes side members 37, substantially hollow front end member 38, substantially hollow rear end member 39, and transversely disposed members 40 and 41. The vertical webs of the side members 37 in this form of cradle are parallel throughout the length of the frame and the bottom flanges on said webs are inwardly presented for the entire length of said webs.

The upper flanges for the greater portion of the distance between front end member 38 and transverse member 41 are outwardly presented, thus giving said side members the shape of Z-bars in cross section between said members 38 and 41 and to the rear of member 41 the outwardly presented top flanges gradually diminish in width outside the vertical webs, and inwardly projecting webs which gradually increase in width toward the rear of the cradle are formed, with the result that the rear portions of said members 37 are channel shape in cross section with both flanges inwardly presented.

By virtue of this construction, sufficient clearance is provided for adjacent and connecting members.

Front end member 38 includes a top plate 42, bottom plate 42ᵃ and intermediate plate 43, and formed through the central portions of the bottom and intermediate plates are vertically alined openings 44, which receive a suitable pin which serves as a pivot point of attachment for the radius bar (not shown).

Member 38 is provided with integral end plates 45, the same being perforated and provided with finished outer faces, thus forming seats and points of attachment for the side members of the main frame of the locomotive.

The rear portions of plates 42 and 43 are united by an integrally formed vertically disposed plate 46, and formed on the lower portion of the face thereof is a horizontally disposed row of outwardly projecting lugs 47, the same being perforated and serving as pads or seats and points of attachment for the lower portion of an expansion plate (not shown).

By referring to Fig. 10, it will be noted that the upper ends of these pads 47 are rounded, such construction being employed in order to prevent any foreign substance, such as cinders or the like, from lodging between the lower portion of the expansion plate and the part to which it is secured, for if the construction were such as to permit the lodgment of cinders or the like, the body of lodged material would soon pack down and from a fulcrum against which the plate would bear, with the result that the continued movement of the plate due to expansion and contraction of the boiler would soon cause crystallization of the metal in said plate and the latter would become unfit for service.

Formed integral with side members 10 slightly to the rear of forward end member 38 are depending brackets 48, each of which is provided with a series of apertures 49, preferably bushed, the same being adapted to receive the pins which form equalizer fulcrums. Formed through the webs of members 37 to the rear of the fulcrum brackets 48 are horizontally alined apertures 50, preferably bushed, the same serving as bearings for the ash pan operating shaft (not shown).

Formed integral with members 37 adjacent the ends of transverse member 41 are brackets 51, the same being finished and perforated in order to serve as seats and points of attachment for spring brackets 52.

Transversely disposed member 40 comprises a pair of depending inclined walls 53, the lower portions of which are united by an integrally formed bottom plate or wall 54, this structure serving as a bracket for spring hangers (not shown).

Formed through the webs of members 37 above and to the rear of this bracket 40 are apertures 55, the same being preferably bushed, and serving as bearings for an ash pan operating shaft (not shown).

The substantially hollow structure 39 at the rear end of the frame or cradle is provided with a centrally arranged pocket 56 which is occupied by the end of the rear draw-bar, the same being pivotally connected to the cradle by means of a pin, which latter is seated in bearings 57 formed in the plates above and below said pocket.

Formed in the structure 39 to the sides of the draw-bar pocket are pockets 58 which are adapted to receive the ends of safety bars (not shown), and which latter are secured to the cradle by means of suitable pins which are seated in openings 59, the same being formed in the plates above and below the pockets 58. The inner end of structure 39 is provided with a vertically disposed transverse wall 60, and formed on the outer face thereof is a series of pads 61, which are similar in construction and serve the same purpose as the pads 47, previously described.

In the modification illustrated in Figs. 11 to 14 inclusive, the frame or cradle which is formed in a single piece, preferably by casting, includes a pair of substantially parallel side members 62, substantially box-shaped front end member 63, a substantially box-shaped rear end member 64, and an intermediate transverse member 65.

The vertical webs of side members 62 are parallel from one end of the frame to the other and between transverse member 65 and rear end member 64, said webs are provided at top and bottom with inwardly presented flanges, so that these portions of the side members are channel-shape in cross section. Between the transverse member 65 and front end member 63, the top flanges on the webs of the side members are outwardly presented and thus these portions of said side members are substantially Z-shape in cross section. This arrangement provides sufficient space and clearance for adjacent and connecting members.

The ends of front end member 63 are provided with vertically disposed plates 66 and 67, the latter being inset with respect to the former, and both pairs of plates are perforated and provided with finished outer faces in order to serve as seats and points of attachment for the side members of the main frame of the locomotive (not shown).

The rear portion of member 63 is provided with a vertically disposed transverse plate 68, with the outer face of which is formed integral a series of lugs 69, the same serving as pads which provide points of attachment for an expansion plate. The upper ends of these pads are pointed or of inverted V-shape in order to prevent the accumulation of ashes and the like between the expansion plate and the wall 69.

Plate 68 is extended downward and formed integral therewith is a pair of horizontally disposed rearwardly projecting members 70, the same being provided with openings 71, preferably bushed, and which openings serve as bearings for the pin to which the radius bar (not shown) is pivotally connected.

Formed integral with the side member 62 at points slightly to the rear of member 63 and arranged at angles to the longitudinal axis of the frame or cradle are pairs of depending plates 72, the same being perforated as designated by 73, and said pairs of plates perform the functions of equalizer fulcrum brackets.

The top and bottom plates of member 64 are provided with a pair of vertically alined openings 74, preferably bushed, said openings serving as bearings for a pin or bolt which serves as a pivot and point of attachment for the rear draw-bar, a portion of which latter occupies a suitable pocket formed in said member 64.

The front wall 76 of the member 64 is provided with a series of pads 77 which are in every way similar to the pads 69 and serving as points of attachment for an expansion plate. Formed integral with or fixed to the side member 62 adjacent to the front end member 64 are outwardly and downwardly projecting brackets 78, the outer lower ends of which are perforated, said brackets performing the functions of spring hangers.

Formed integral with or rigidly fixed to the underside of member 64 and centrally arranged thereupon is a depending bracket 79, the lower portion of which is in the form of a transversely disposed cylinder 80, the same serving as a housing or case for the truck centering spring (not shown).

Formed integral with the right hand one of the members 62 and near the rear end of the frame or cradle is an outwardly projecting bracket 81, the same being provided with suitable bearings 82 which are adapted to receive the fulcrum or pivot pin of the reverse lever (not shown).

In the modification illustrated in Figs. 15 to 17 inclusive, the frame or cradle is formed in a single piece, preferably by casting, and comprises a pair of substantially parallel side members 83, a substantially hollow front end member 84, substantially hollow rear end member 85, and a transversely disposed intermediate brace member 86.

The members 83 forming a part of this frame or cradle are composed of vertically disposed longitudinally extending webs, the same being flanged top and bottom, with the flanges to the rear of transverse member 86 inwardly disposed and with the top flange in front of said transverse member outwardly disposed. Thus, the portions of the side members to the rear of member 86 are channel shape in cross section, while in front of said transverse member they are Z-shape in cross section.

The substantially hollow member 84 is provided near its forward end with a pair of vertically alined apertures 87 which serve as bearings for the pivot pin of the trailer truck, and formed on the underside of member 84 is a plate 88 which serves as a friction pad bearing. Both members 84 and 85 are provided with vertical walls on which are formed lugs 89, the upper ends of which are pivoted or rounded, and said lugs serving as pads or points of attachment for expansion plates (not shown).

Formed in member 85 is a centrally arranged bearing 90 for the pivot pin of the rear draw-bar, and formed in said member 85 to the sides of this bearing are bearings 91 which receive the pins which secure the safety bars to the frame or cradle. Formed integral with and projecting outwardly from the rear portion of the frame or cradle are spring hanger brackets 92.

In the modified construction illustrated in Figs. 18 to 21 inclusive the frame or cradle is formed in a single piece, preferably by casting, and comprises side members 93, a front end member 94, a rear end member 95, and an intermediate transverse brace member 96. Those portions of the side members 93 to the rear of brace 96 are substantially channel shape in cross section with the flanges inwardly presented, and those portions of said side members in front of the brace member are substantially Z-shape in cross section.

Front end member 94 is provided with side plates 97 which are perforated and provided with finished outer faces to serve as seats and points of attachment for the main side rails of the locomotive frame, and formed in said front end member 94 is a bearing 98 for the radius bar (not shown).

Formed on top of member 94 and to the sides of the radius bar bearing are horizontally disposed plates 99 which perform the functions of bearings for expansion pads which are carried by the fire box. Formed integral with the sides of members 93 to the rear of member 94 and inclined with respect to the longitudinal axis of the frame or cradle are equalizer fulcrum brackets 100.

Formed in rear end member 95 is a bearing 101 adapted to receive the pin which serves as a pivot and point of attachment for the rear draw-bar, a portion of the latter occupying a pocket suitably formed in said member 95.

Formed integral with a vertically disposed plate 102, which latter forms a part of member 95, is a series of lugs or pads 103 which serves as a point of attachment for an expansion plate.

Formed integral with the underside of member 95 is a depending bracket 104, the lower portion of which is in the form of a transversely disposed tube, the same serving as a housing or case for the truck centering spring.

Formed integral with the members 93 between rear end member 95 and brace member 96 are outwardly projecting spring hanger brackets 105.

Frames or cradles of my improved construction are very strong and rigid, can be produced with much less time, labor and expense than frames which are assembled or built up from a number of structural shapes and castings. Further, a one piece structure eliminates joints and consequently does away with structural weaknesses which invariably develop where an assembled or fabricated structure is subjected to service strains and vibrations.

My improved frame is particularly designed to be utilized in connection with various types of locomotives and trailer truck frames now in general use, and to this end, the parts of the frames are arranged so as to accommodate the various essential connecting members, and likewise to provide ample space and clearance for adjacent parts of the locomotive and trailer truck frame.

It will be readily understood that minor changes in the size, form and construction of the various parts of my improved frame can be made and substituted for those herein shown and described, without departing from the spirit of my invention, the scope of which is set forth in the appended claims.

I claim:

1. A locomotive cradle having side members, each comprising a vertically disposed web, and horizontally disposed flanges near the top and bottom of said web, portions of one of which flanges are inwardly presented and other portions being outwardly presented.

2. A locomotive cradle having side members, each comprising a vertically disposed web, and horizontally disposed flanges near the top and bottom of said web, portions of one of which flanges are offset with respect to each other and with respect to the other flange.

3. A locomotive cradle having flanged side members, the flanges of said side members being disposed so that portions of said members are substantially channel shape in cross section and other portions being substantially Z-shape in cross section.

4. A locomotive cradle having flanged side members, the flanges of said side members being disposed so that portions of said members are substantially channel shape in cross section, other portions being substantially Z-shape in cross section, and other portions being substantially of I-beam shape in cross section.

5. A locomotive cradle having side members, the same comprising vertically disposed webs which are substantially parallel throughout the length of the frame, a pair of flanges integral with each web, portions of each pair of flanges being inwardly presented, and portions being outwardly presented.

6. A locomotive cradle having side members, the same comprising vertically disposed webs which are substantially parallel throughout the length of the frame, a pair of flanges integral with each web, a portion of one of each of the flanges being inwardly presented, and another portion being outwardly presented.

7. A locomotive cradle having side members, each comprising a vertically disposed web, horizontally disposed flanges near the top and bottom of said webs, portions of one of which flanges are inwardly presented and other portions being outwardly presented, and transversely disposed flanged members formed integral with and connecting said side members.

8. A locomotive cradle having side members, each comprising a vertically disposed web, horizontally disposed flanges near the top and bottom of said webs, portions of one of which flanges are offset with respect to each other and with respect to the other flange, and transversely disposed flanged members formed integral with and connecting said side members.

9. A locomotive cradle having flanged side members, the flanges of said side members being disposed so that portions of said members are substantially channel shape in cross section and other portions being substantially Z-shape in cross section, and transversely disposed flanged members formed integral with and connecting said side members.

10. A locomotive cradle having flanged side members, the flanges of said side members being disposed so that portions of said members are substantially channel shape in cross section, other portions being substantially Z-shape in cross section, and other portions being substantially of I-beam shape in cross section, and transversely disposed flanged members formed integral with and connecting said side members.

11. A locomotive cradle having side members, the same comprising vertically disposed webs which are substantially parallel throughout the length of the frame, a pair of flanges integral with each web, portions of each pair of flanges being inwardly presented, and portions being outwardly presented, and transversely disposed flanged members formed integral with and connecting said side members.

12. A locomotive cradle having side members, the same comprising vertically disposed webs which are substantially parallel throughout the length of the frame, a pair of flanges integral with each web, a portion of one of each of the flanges being inwardly presented and another portion being outwardly presented, and transversely disposed flanged members formed integral with and connecting said side members.

13. A locomotive cradle having side members composed of straight vertically disposed parallel webs, and a pair of flanges on each web, said flanges being arranged so as to vary the width of the space between said side members.

14. A locomotive cradle having side members composed of straight vertically disposed parallel webs, flanges integral with said webs adjacent to the tops and bottoms thereof, certain portions of said flanges being inwardly presented with respect to the webs and other portions being outwardly presented so as to vary the width of the space between said side members.

15. A locomotive cradle formed in a single piece and comprising side members and a series of transversely disposed members, and brackets on said cradle, which brackets form bearings for expansion pads carried by the locomotive fire box.

16. A locomotive cradle formed in a single piece and comprising side members and a series of transversely disposed members, and portions of the outer side faces of said side members being finished to provide seats for the attachment of cab brackets.

17. A locomotive cradle formed in a single piece and composed of a pair of side members a series of transversely disposed members, and a hollow structure disposed between the rear ends of said side members, said hollow structure being provided with a drawbar pocket and with pockets adapted to receive the ends of safety bars.

18. A locomotive cradle formed in a single piece and composed of a pair of side members and a series of transversely disposed members, and said cradle being provided adjacent to one end with bearings adapted to receive safety bar securing means.

19. A locomotive cradle formed in a single piece and composed of a pair of side members and a series of transversely disposed members, and said cradle being provided adjacent to one end with a radius bar bearing.

20. A locomotive cradle formed in a single piece and composed of a pair of side members a series of transversely disposed members, a hollow front end member and a hollow rear end member, said front end member being provided with a pocket adapted to receive the forward end of a trailer truck frame and with bearings adapted to receive the trailer truck frame pivot pin and the rear end member being provided with a drawbar pocket and a pair of pockets adapted to receive the ends of safety bars.

21. A locomotive cradle provided with a transverse member and a series of spaced lugs on said member, which lugs serve as seats and points of attachment for an expansion plate.

22. A locomotive cradle provided with a transverse member and a series of spaced lugs on said member, which lugs serve as seats and points of attachment for an expansion plate, the upper ends of which lugs are rounded or inclined so as to permit the ready downward movement of foreign substance between the transverse member and the expansion plate.

23. A locomotive cradle formed in a single piece and comprising side members and a series of transverse members, and a series of spaced expansion plate attaching members on one of said transverse members.

24. A locomotive cradle formed in a single piece and comprising a pair of side members and a series of transversely disposed members, and bearings on said side members for an ash pan operating shaft.

25. A locomotive cradle formed in a single piece and comprising a pair of side members and a series of transversely disposed members, and finished pads on said side members, which pads serve as seats and points of attachment for spring brackets.

26. A locomotive cradle formed in a single piece and comprising a pair of side members and a series of transversely disposed members, and spring hanger brackets projecting laterally from said side members.

27. A locomotive cradle formed in a single piece and comprising a pair of side members and a series of transversely disposed members, and a housing on said cradle for the trailer truck centering spring.

28. A locomotive cradle formed in a single piece and comprising a pair of side members and a series of transversely disposed members, and a reverse lever fulcrum bearing on one of said side members.

29. A locomotive cradle formed in a single piece and comprising side members, a series of transverse members, expansion pad brackets, equalizer fulcrum brackets, and said cradle being provided with pockets and bearings for safety bars and with a pocket and bearing for a radius bar.

30. A locomotive cradle formed in a single piece and comprising side members, a series of transversely disposed members, a spring hanger bracket, equalizer fulcrum brackets, pads serving as seats and points of attachment for an expansion plate, and the side members being provided with bearings adapted to receive an ash pan operating shaft.

In testimony whereof I hereunto affix my signature in the presence of two witnesses, this 28th day of July, 1916.

WILLIAM M. SHEEHAN.

Witnesses:
C. T. WESTLAKE,
FRED W. DIECKMANN.